US007828310B2

(12) United States Patent
Vreeswijk et al.

(10) Patent No.: US 7,828,310 B2
(45) Date of Patent: Nov. 9, 2010

(54) CHASSIS STRUCTURE FOR MID-WHEEL DRIVE POWER WHEELCHAIR

(75) Inventors: Wilhelmus Hendrikus Johannes Adriana Vreeswijk, Perth (AU); Lawrence William Anthony Roycroft, Perth (AU)

(73) Assignee: Karma Medical Products Co., Ltd., Chiayi Hsien (TW)

( * ) Notice: Subject to any disclaimer, the term of this patent is extended or adjusted under 35 U.S.C. 154(b) by 78 days.

(21) Appl. No.: 12/392,375

(22) Filed: Feb. 25, 2009

(65) Prior Publication Data

US 2010/0213683 A1 Aug. 26, 2010

(51) Int. Cl.
*B62M 1/14* (2006.01)

(52) U.S. Cl. ................. 280/250.1; 280/304.1; 280/755; 180/22; 180/907

(58) Field of Classification Search .............. 280/250.1, 280/304.1, 755; 180/22, 65.1, 907
See application file for complete search history.

(56) References Cited

U.S. PATENT DOCUMENTS

| | | | | |
|---|---|---|---|---|
| 7,083,195 | B2 * | 8/2006 | Goertzen et al. | 280/755 |
| 7,207,403 | B2 * | 4/2007 | Grymko et al. | 180/65.1 |
| 7,264,272 | B2 * | 9/2007 | Mulhern et al. | 280/755 |
| 7,293,801 | B2 * | 11/2007 | Bertrand et al. | 280/755 |
| 7,389,835 | B2 * | 6/2008 | Mulhern et al. | 180/22 |
| 7,413,038 | B2 * | 8/2008 | Mulhern et al. | 180/22 |
| 7,726,689 | B2 * | 6/2010 | Mulhern et al. | 280/755 |
| 2006/0022445 | A1 * | 2/2006 | Mulhern et al. | 280/755 |
| 2006/0249317 | A1 * | 11/2006 | Fought | 180/65.1 |
| 2008/0265541 | A1 * | 10/2008 | Mulhern et al. | 280/124.106 |

* cited by examiner

*Primary Examiner*—Toan C To
(74) *Attorney, Agent, or Firm*—Rosenberg, Klein & Lee

(57) ABSTRACT

A chassis structure for a mid-wheel drive power wheelchair includes a pair of restricting racks each having a first restricting plate and a second restricting plate. Each restricting plate has a slot at a central portion thereof. A first fixing member is inserted through one end of the first restricting plate and the slot of the second restricting plate, and a second fixing member is inserted through one end of the second restricting plate and the slot of the first restricting plate, so that the two restricting plates overlap to extend and restrict with each other for maintaining a steady and balancing ride.

2 Claims, 11 Drawing Sheets

CHASSIS STRUCTURE FOR MID-WHEEL DRIVE POWER WHEELCHAIR

BACKGROUND OF THE INVENTION

1. Field of the Invention

The present invention relates to a chassis structure for a mid-wheel drive power wheelchair, and more particularly to one that uses a restricting rack having a slot to absorb a slight drop height of a front wheel rod, a driving unit and a rear wheel rod and to maintain a balancing of wheels.

2. Description of the Prior Art

Wheelchairs are necessity to the elderly and some disabled people for their daily life. As shown in FIG. 11, a conventional chassis structure for a mid-wheel drive power wheelchair comprises a frame A, a front wheel unit B, a driving unit C, a shock absorber unit D and a rear wheel unit E. The shock absorber unit D is pivotally connected to the frame A. The shock absorber unit D comprises a rod D1 and a block D2 at a central section thereof. The block D2 has a first end D21 and a second end D22. The block D2 is secured to the frame A. The first end D21 of the block D2 is provided with a first connecting seat D3. The first connecting seat D3 is secured to a connecting member C1 of the driving unit C. A first elastic member D4 is provided between the block D2 and the first end D21, and a second elastic member D5 is provided between the block D2 and the second end D22 for maintaining a high stability of the wheelchair and providing a shock absorbing effect.

However, if the wheelchair runs on a depression or a bump in a fast speed, the front wheel unit B, the driving unit C and the rear wheel unit E will have a differential drop height. Thus, the first elastic member D4 and the second elastic member D5 can not react in a first response and the wheelchair will have a minus vibration, which makes the rider uncomfortable. Once the vibration is too strong, the frame A may incline.

SUMMARY OF THE INVENTION

According to the present invention, there is provided a chassis structure for a mid-wheel drive power wheelchair comprising:

- a frame comprising a front section, two side sections, and three connecting rods, the three connecting rods being pivotally connected to the front section and the two side sections, respectively;
- a transverse pipe having two ends and a middle section between the two ends, the middle section being connected with the connecting rod on the front section of the frame;
- a pair of front wheel rods each having a first end, a second end and a first connecting portion between the first end and the second end, the first end being connected with a front wheel;
- a pair of driving units each secured to the second end of a relative front wheel rod and comprising a driving wheel and a second connecting portion;
- a pair of connecting racks each having a first end and a second end, the first end being pivotally connected to the first connecting portion of a relative front wheel rod, the second end being connected with to a press cylinder, the press cylinder having a third connecting portion, the pair of connecting racks being secured to the two ends of the transverse pipe, respectively;
- a pair of restricting racks each comprising a first restricting plate and a second restricting plate, the first restricting plate having a first end, a second end and a first slot at a central portion thereof, the second restricting plate having a first end, a second end and a second slot at a central portion thereof, a first fixing member inserting through the second end of the first restricting plate and the second slot of the second restricting plate, a second fixing member inserting through the second end of the second restricting plate and the first slot of the first restricting plate, the first restricting plate and the second restricting plate overlapping for extending and restricting with each other, the first end of the first restricting plate being pivotally connected to the second connecting portion of a relative driving unit; and
- a pair of rear wheel rods each having a first end and a second end, the first end being connected with a rear wheel, the second end having a fourth connecting portion and a fifth connecting portion and being connected with an action rod, the action rod having a first end and a second end, the connecting rod on a relative side section of the frame being inserted through the first end of the action rod and pivotally connected to the fourth connecting portion of the second end of a relative rear wheel rod, the second end of the action rod being secured to a relative connecting rack, the action rod having a sixth connecting portion, the sixth connecting portion being pivotally connected to the first end of the second restricting plate of a relative restricting rack, the fifth connecting portion of the second end of the rear wheel rod being connected to the third connecting portion of a relative press cylinder.

Preferably, the two ends of the transverse pipe are provided with rubber sleeves.

It is the primary objective of the present invention to provide a chassis structure for a mid-wheel drive power wheelchair, which has the best shock absorbing effect when running on a depression or on a bump.

It is another objective of the present invention to provide a chassis structure for a mid-wheel drive power wheelchair, which uses the press cylinders to maintain the front wheels and the rear wheels contact with the ground so that the wheelchair rolls in a steady status.

It is a further objective of the present invention to provide a chassis structure for a mid-wheel drive power wheelchair, which maintains the frame in a balancing and steady status.

It is still a further objective of the present invention to provide a chassis structure for a mid-wheel drive power wheelchair, which maintains the frame in the best straight position with the rubber sleeves covered on the two ends of the transverse pipe. When the wheelchair rolls on a bump, the rubber sleeves will absorb the twisted or torque force for maintaining the front wheel rods, the driving units, the connecting racks, and the rear wheel rods in a straight status.

DETAILED DESCRIPTION OF THE PREFERRED EMBODIMENT

Figure 1:
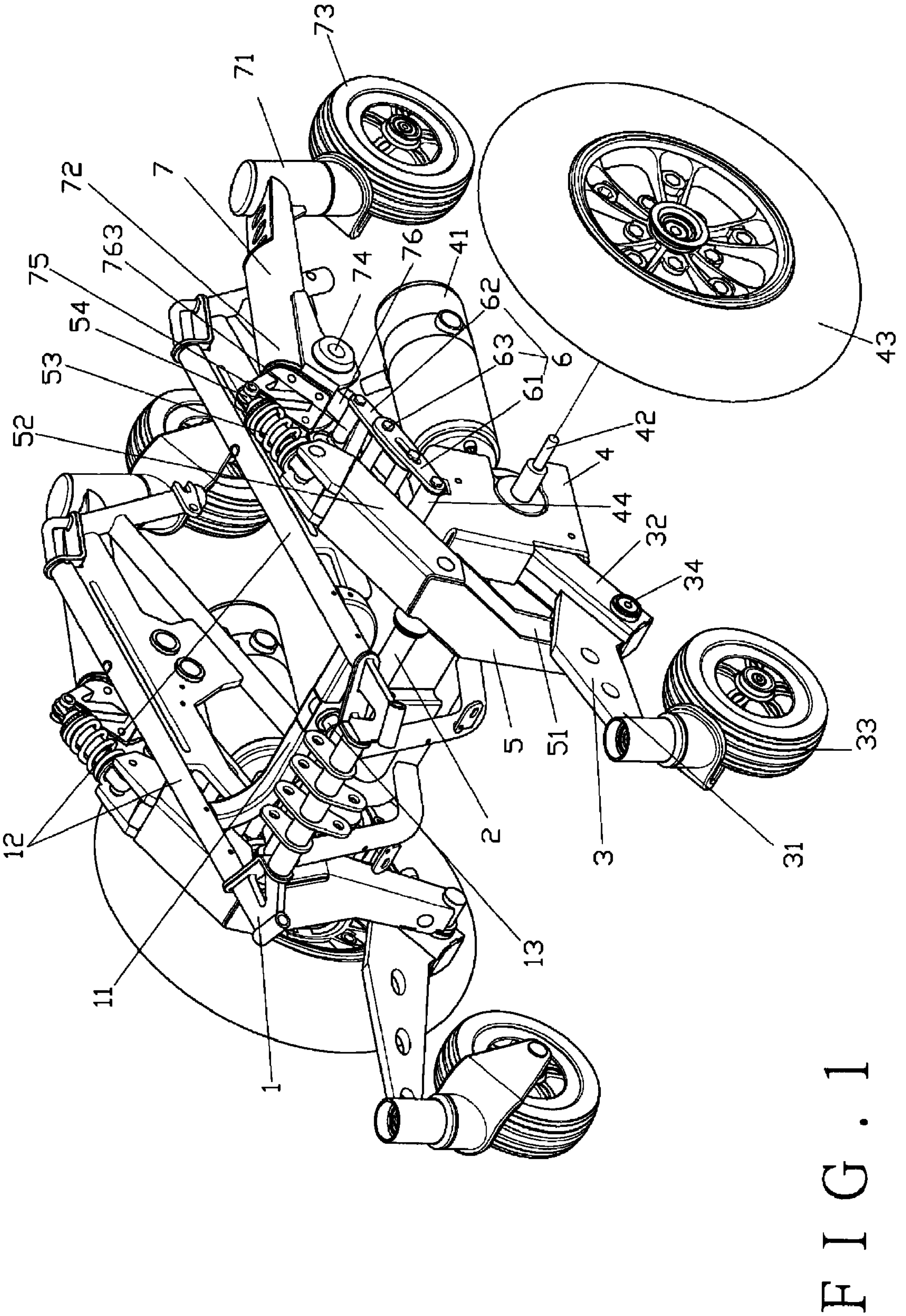
FIG. 1 is a perspective view of the present invention.
Figure 2:
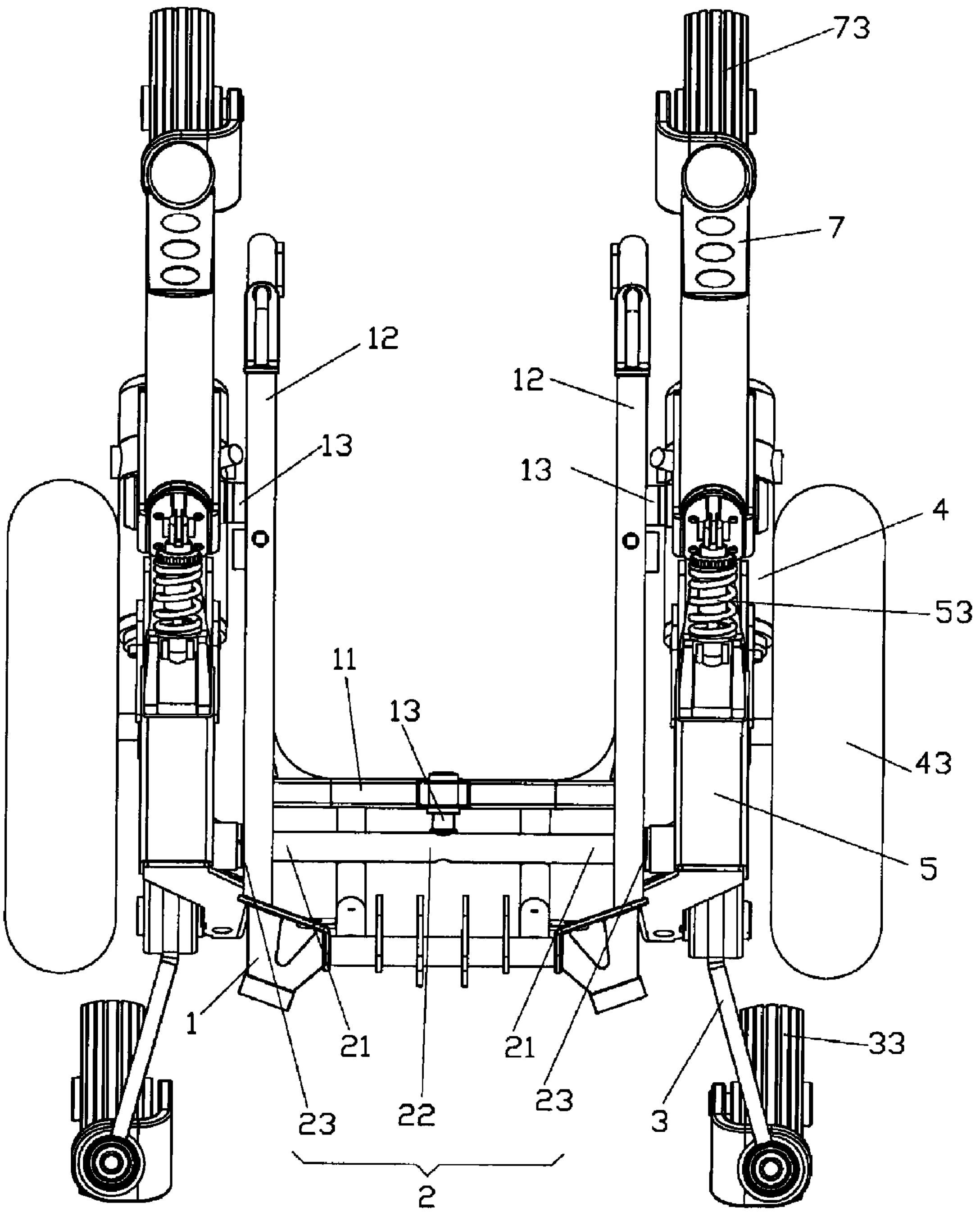
FIG. 2 is a front view of the present invention.
Figure 3:
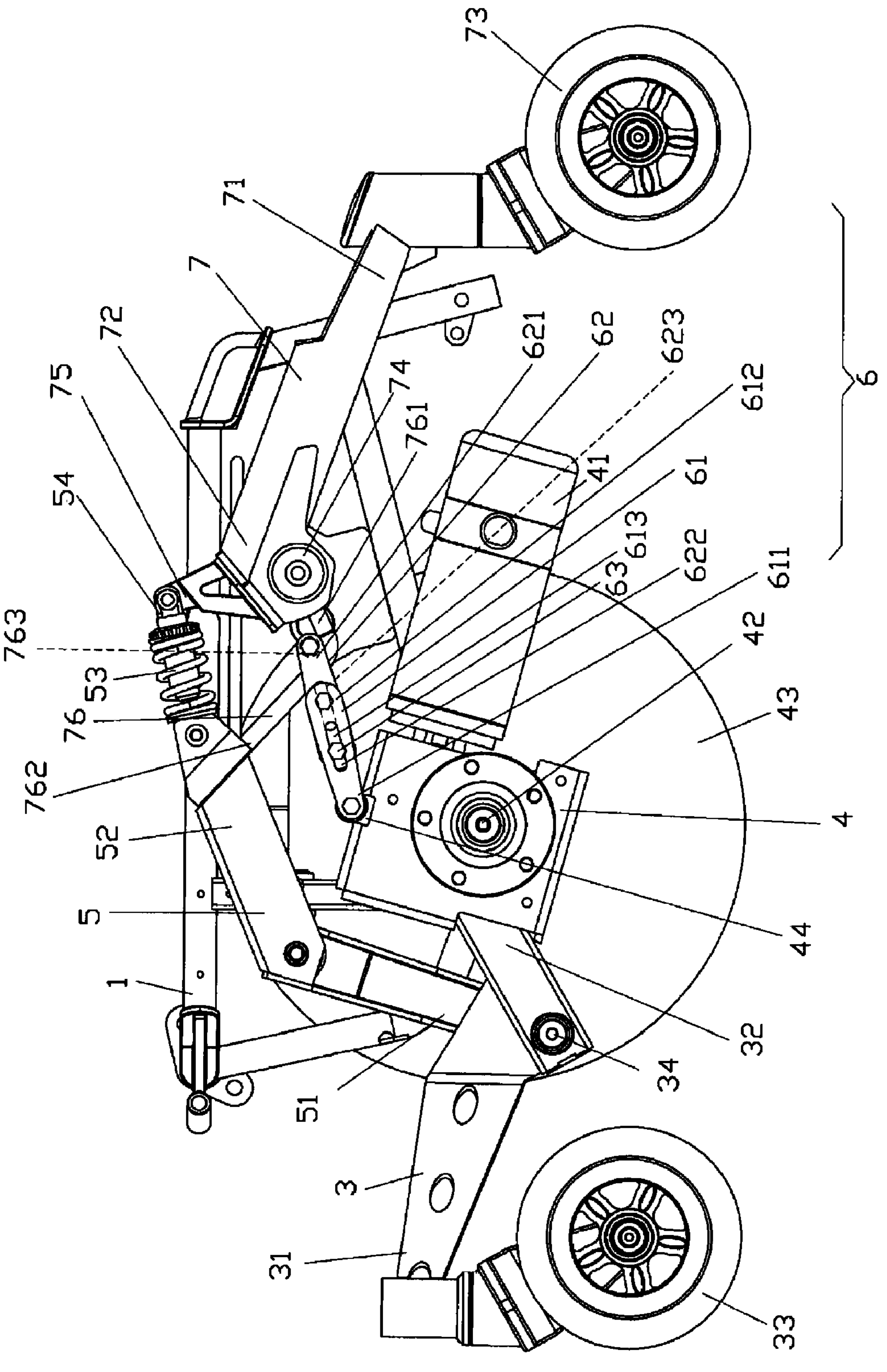
FIG. 3 is a side view of the present invention.

As shown in FIGS. 1, 2, and 3, a chassis structure for a mid-wheel drive power wheelchair of the present invention comprises a frame 1, a transverse pipe 2, a pair of front wheel rods 3, a pair of driving units 4, a pair of connecting racks 5, a pair of restricting racks 6, and a pair of rear wheel rods 7.

The frame 1 comprises a front section 11, two side sections 12, and three connecting rods 13 connected to the front section 11 and the two side sections 12, respectively.

The transverse pipe 2 has two ends 21 and a middle section 22 between the two ends 21. The middle section 22 is pivotally connected to the connecting rod 13 on the front section 11 of the frame 1. The two ends 21 of the transverse pipe 2 are covered with rubber sleeves 23.

Each front wheel rod 3 has a first end 31, a second end 32 and a first connecting portion 34 between the first end 31 and the second end 32. The first end 31 is connected to a front wheel 33.

Each driving unit 4 is secured to the second end 32 of a relative front wheel rod 3, and comprises a motor 41, a driving shaft 42, a driving wheel 43, and a second connecting portion 44.

Each connecting rack 5 has a first end 51 and a second end 52. The first end 51 is pivotally connected to the first connecting portion 34 of the front wheel rod 3. The second end 52 is connected with a first end of a press cylinder 53. A second end of the press cylinder 53 has a third connecting portion 54. The two connecting racks 5 are secured to the two ends 21 of the transverse pipe 2.

Each restricting rack 6 comprises a first restricting plate 61 and a second restricting plate 62. The first restricting plate 61 has a first end 611, a second end 612, and a first slot 613 at a central portion thereof. The second restricting plate 62 has a first end 621, a second end 622, and a second slot 623 at a central portion thereof. With a fixing member 63 inserting through the second end 612 of the first restricting plate 61 and the second slot 623 of the second restricting plate 62 as well as another fixing member 63 inserting through the second end 622 of the second restricting plate 62 and the first slot 613 of the first restring plate 61, the first restricting plate 61 and the second restricting plate 62 overlap, allowing them to be extended and restricted with each other. The first end 611 of the first restricting plate 61 is pivotally connected to the second connecting portion 44 of a relative driving unit 4.

Each rear wheel rod 7 has a first end 71 and a second end 72. The first end 71 is connected with a rear wheel 73. The second end 72 has a fourth connecting portion 74 and a fifth connecting portion 75. The second end 72 is connected with an action rod 76. The action rod 76 has a first end 761 and a second end 762. The connecting rod 13 on a relative side section 12 of the frame 1 is inserted through the first end 761 of the action rod 76 and pivotally connected to the fourth connecting portion 74 of the second end 72 of the rear wheel rod 7, referring to the FIG. 2. The second end 762 of the action rod 76 is secured to a relative connecting rack 5. The action rod 76 has a sixth connecting portion 763 which is pivotally connected to the first end 621 of the second restricting plate 62 of the restricting rack 6. The fifth connecting portion 75 of the second end 72 of the rear wheel rod 7 is connected with the third connecting portion 54 of the press cylinder 53.

Figure 4:
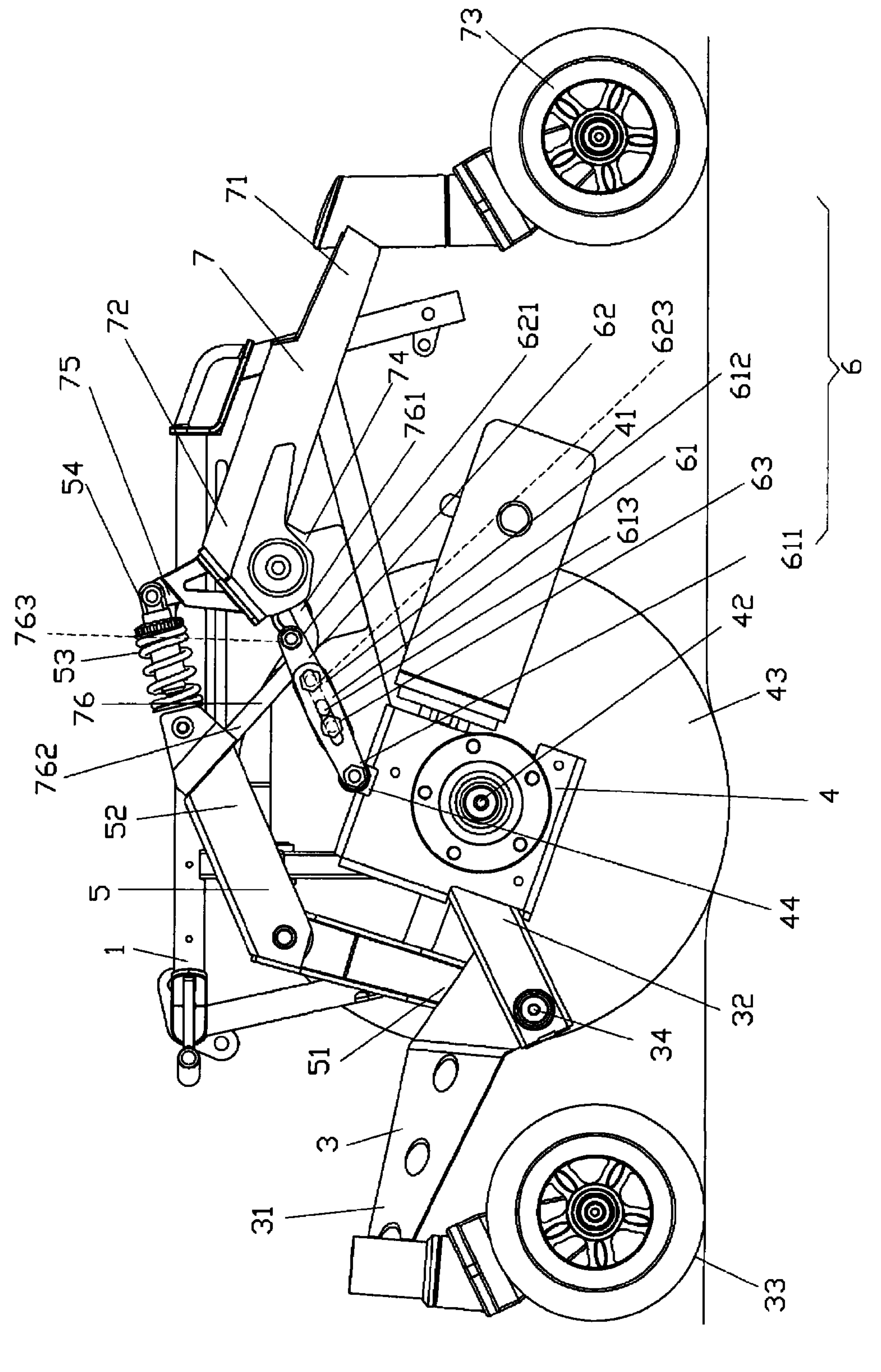
FIG. 4 is a side view showing a driving wheel of the present invention running on a small depression.

When the driving wheels 43 roll on a small depression, as shown in FIG. 4, the second connecting portions 44 of the driving units 4 will push the first restricting plates 61 of the restricting racks 6 to displace, and the fixtures 63 will slide along the first slots 613 of the first restricting plates 61. Thus, only the first restricting plates 61 are moved, and the second restricting plates 62 are not affected. Neither the front wheel rods 3 nor the rear wheel rods 7 will be affected by the depression. In case the driving wheels 43 roll on a bump, only the first restricting plates 61 will be raised (not shown in the drawings).

Therefore, the first restricting plates 61 will be affected to displace when either the driving wheels 43 or the front wheel rods 3 are descending or ascending. On the contrary, the second restricting plates 62 will be affected to displace when the rear wheel rods 7 are descending or ascending.

Figure 5:
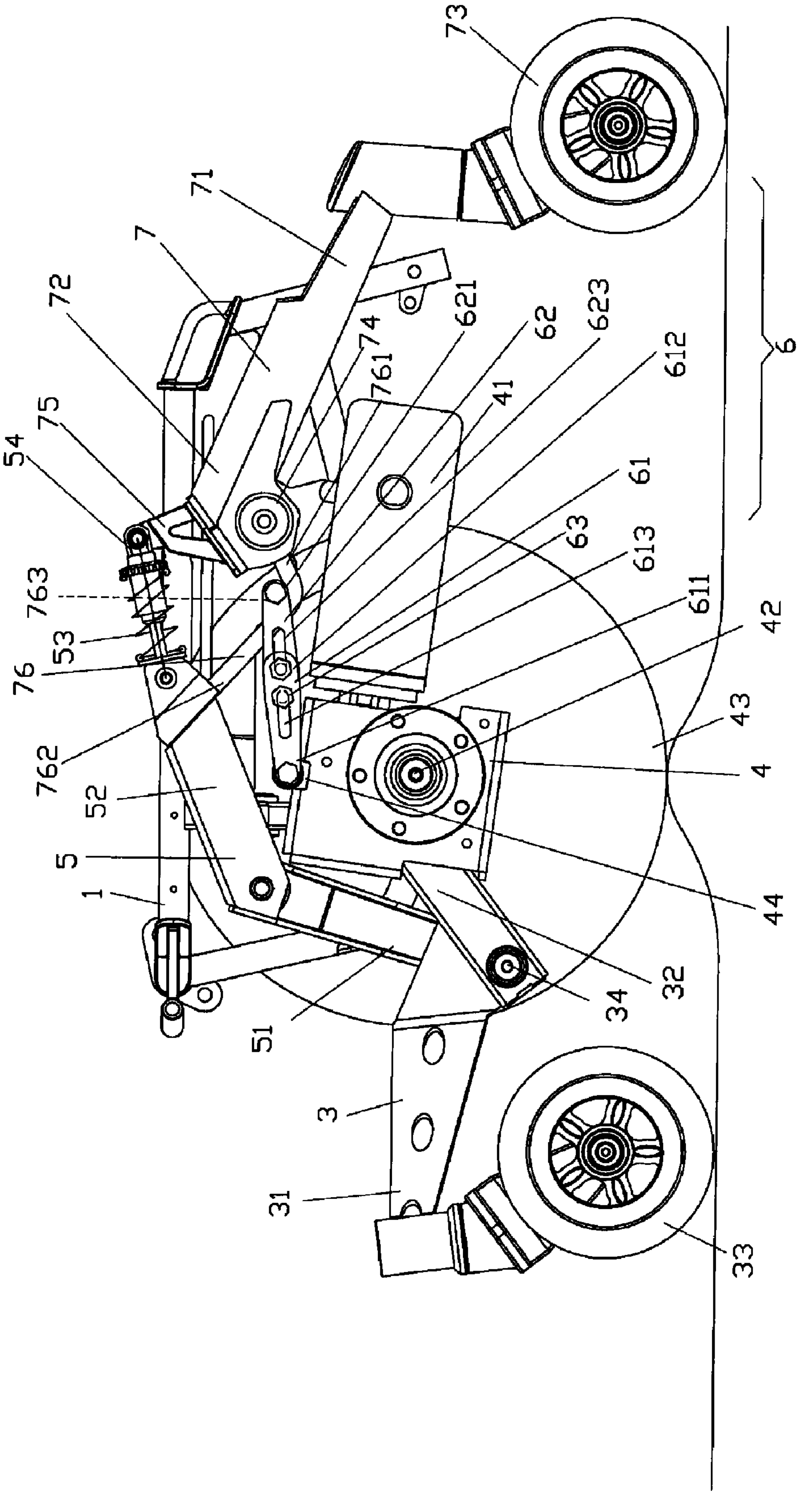
FIG. 5 is a side view showing the driving wheel of the present invention running on a bump.
Figure 6:
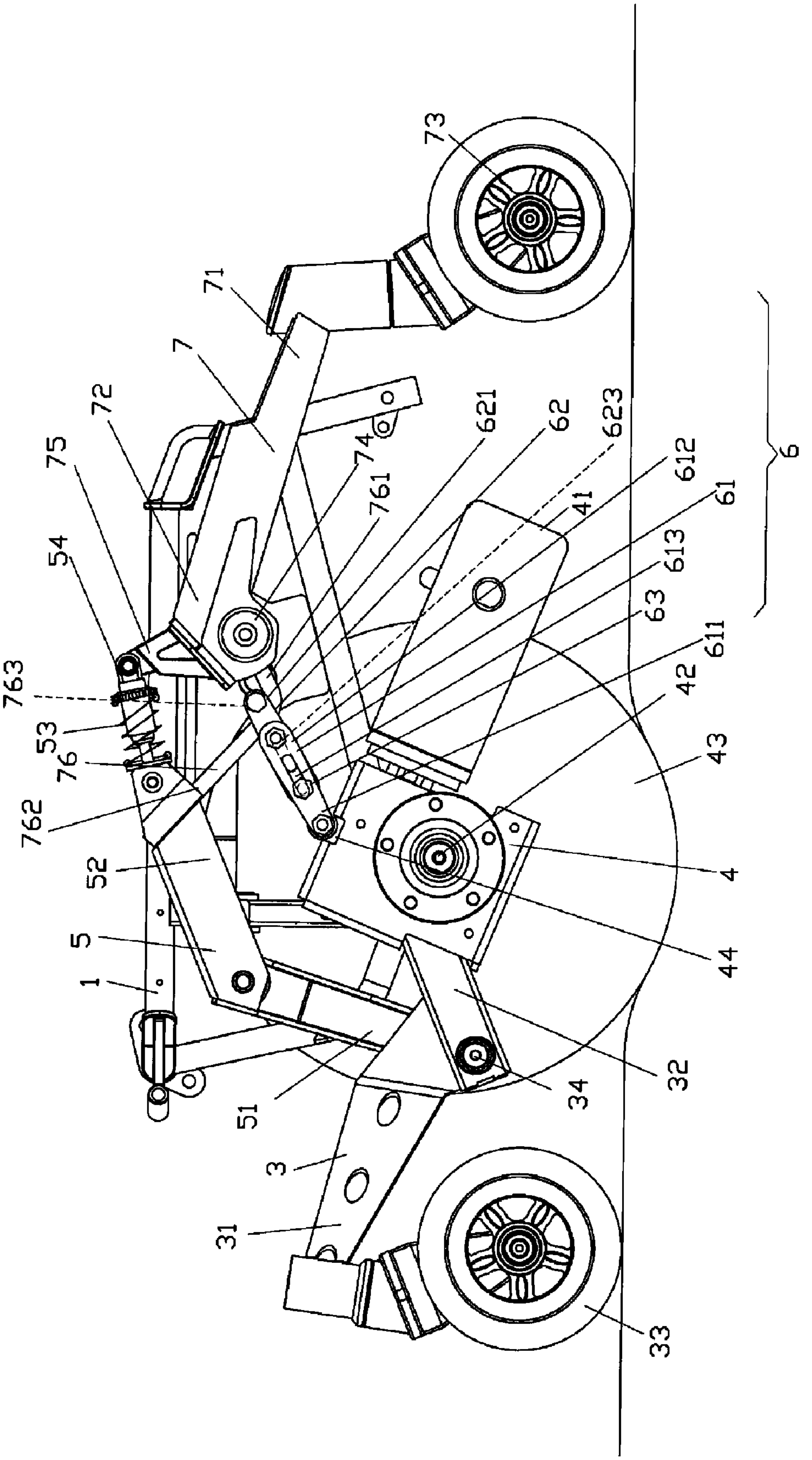
FIG. 6 is a side view showing the driving wheel of the present invention rolling on a big depression.

FIGS. 5 through 8 show the operation of the present invention. As shown in FIG. 5, when the driving wheels 43 roll on a bump, in particular on a rough road, the driving units 4 will be linked to ascend, which brings the first restricting plates 61 of the restricting racks 6 to displace and pushes the connecting racks 5 to compress the press cylinders 53. As shown in FIG. 6, when the driving wheels 6 are descending, the driving units 4 will be linked to descend, which brings the first restricting plates 61 of the restricting racks 6 to displace and pulls the connecting racks 5 to restore the press cylinders 53 to their original positions.

Figure 7:
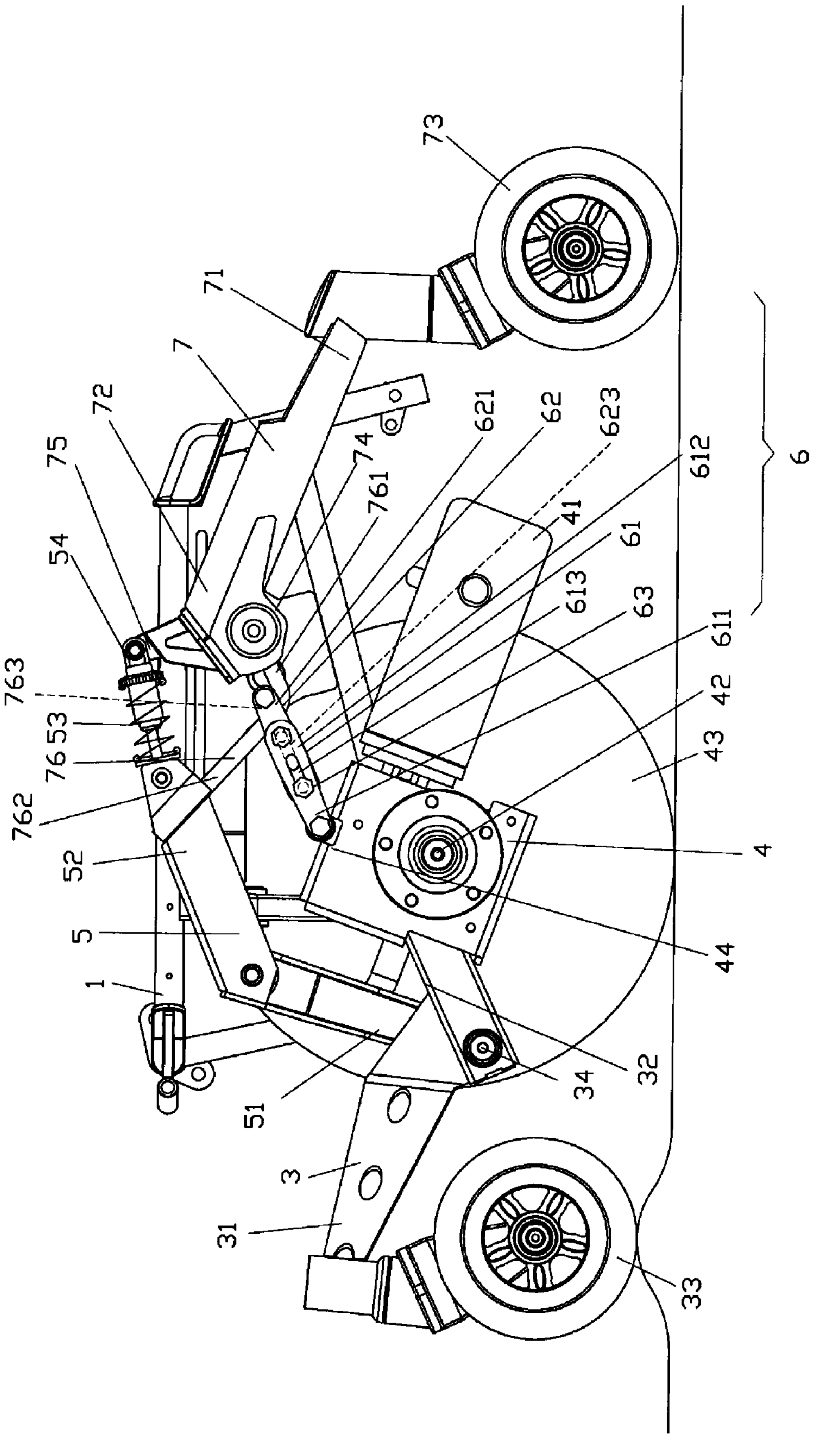
FIG. 7 is a side view showing a front wheel of the present invention rolling on a bump.

As shown in FIG. 7, when the front wheels 33 roll on a bump, the first connecting portions 34 of the front wheel rods 3 and the second connecting portions 44 of the driving units 4 will be linked to ascend. The first connecting portions 34 push the connecting racks 5 to compress the press cylinders 53. The second connecting portions 44 bring the first restricting plates 61 to displace. On the contrary, when the front wheels 33 roll on a depression, the actuation from the above will be in an opposite direction.

Figure 8:
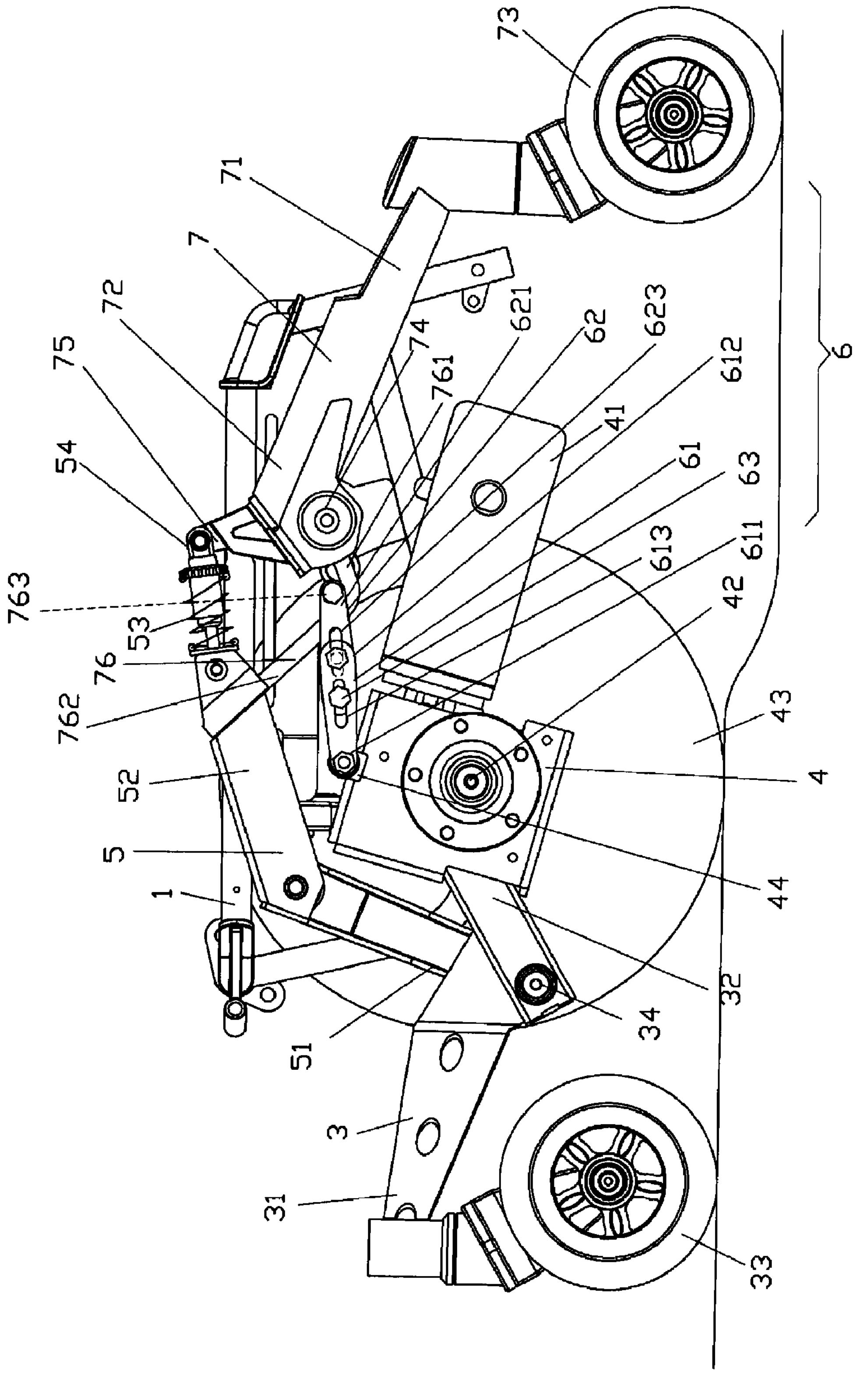
FIG. 8 is side view showing a rear wheel of the present invention rolling on a depression.

As shown in FIG. 8, when the rear wheels 73 roll on a depression, the rear wheels 73 will descend to rotate with the fourth connecting portions 74 of the second ends 72 of the rear wheel rods 7 functioning as fulcrums, which brings the second restricting plates 62 to displace by the action rods 76 and the fifth connecting portions 75 to restore the press cylinders 53. On the contrary, when the rear wheels 73 rolls on a bump, the actuation from the above will be in an opposite direction.

Figure 9:
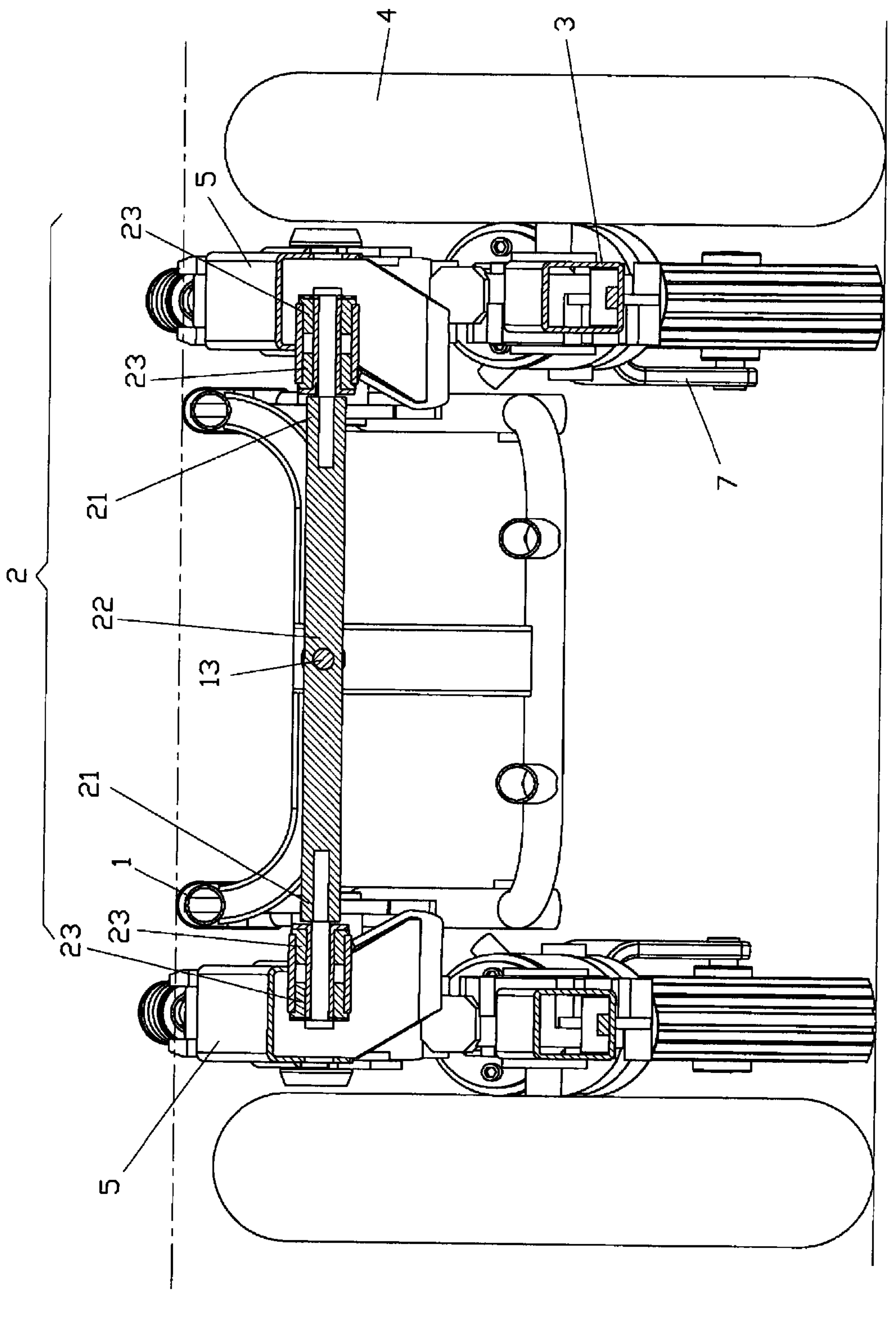
FIG. 9 is a front view showing the assembly of a transverse pipe of the present invention.
Figure 10:
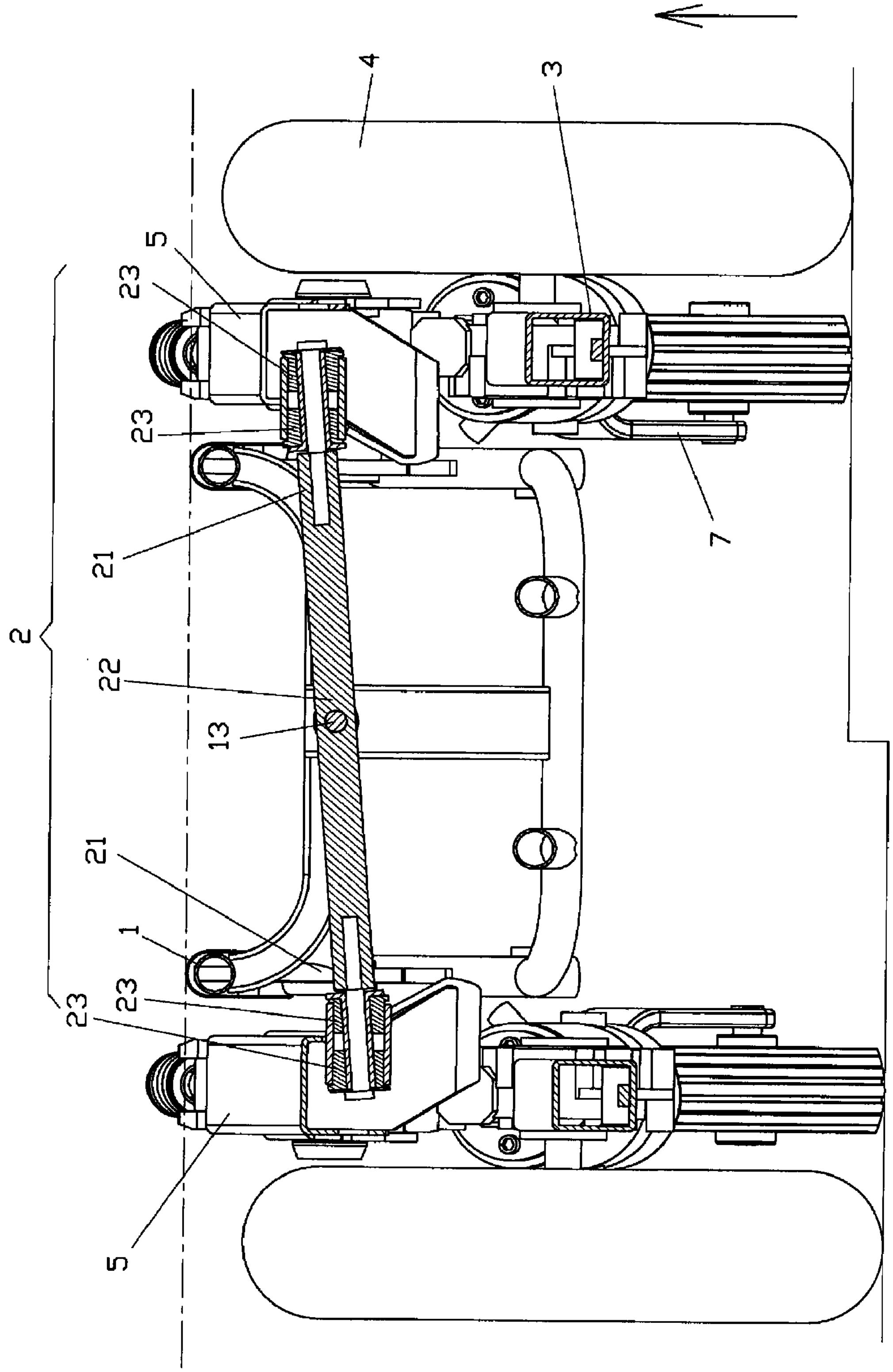
FIG. 10 is a front view showing the operation of the transverse pipe of the present invention.
Figure 11:
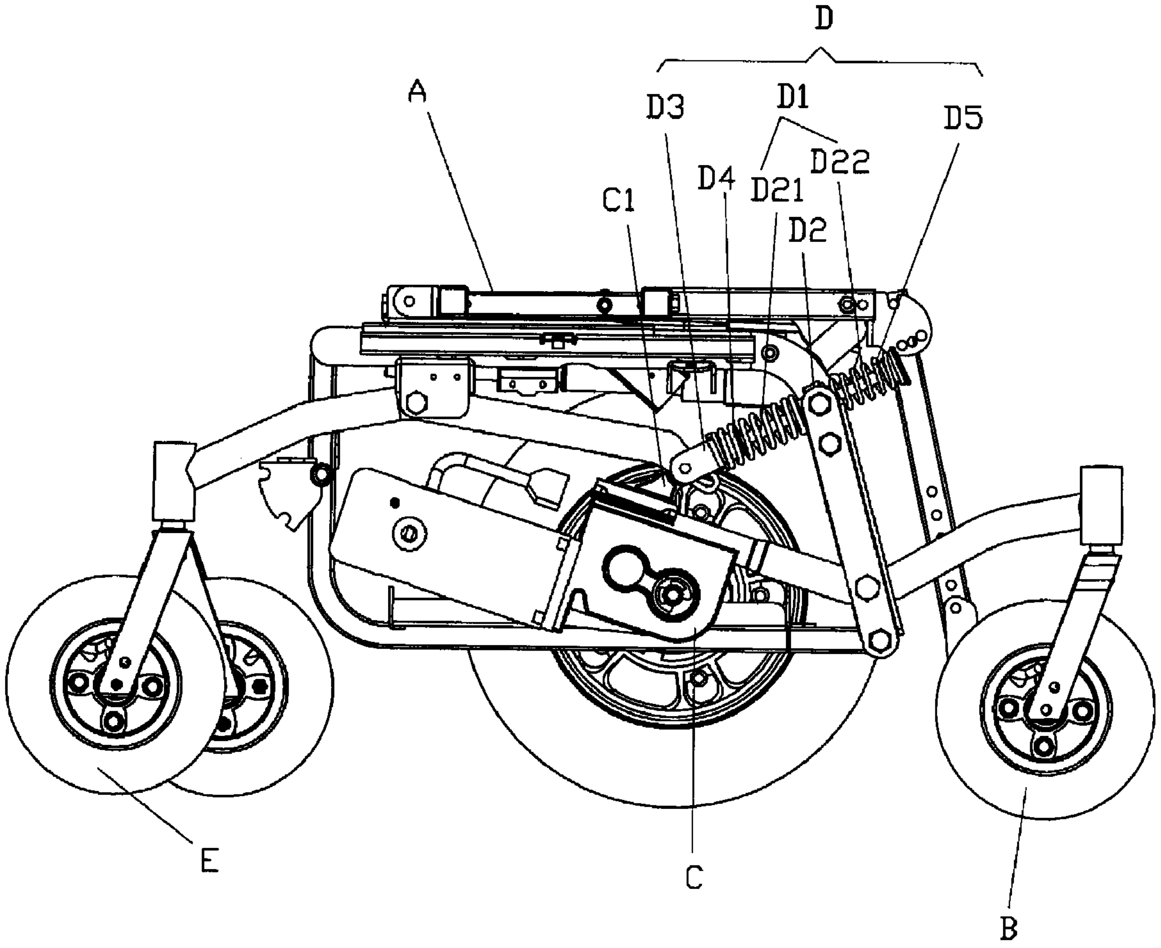
F I G . 11 (PRIOR ART)
FIG. 11 is a side view of a conventional power wheelchair.

To assemble the transverse pipe 2, as shown in FIGS. 9 and 10, the middle section 22 of the transverse pipe 2 is connected with the connecting rod 13 on the front section 11 of the frame 1, and the two ends 21 of the transverse pipe 2 are secured to the connecting racks 5 and covered with the rubber sleeves 23 thereon. When the connecting racks 5 move upward and downward, the rubber sleeves 23 will absorb the twisted or torque force to maintain the front wheel rods 3, the driving units 4, the connecting racks 5, and the rear wheel rods 7 in a straight status, so that the wheelchair remains in a steady movement. As shown in FIGS. 9 and 10, the frame 1 is in a leveling status, which maintains the wheelchair in a steady status without shaking or inclining so as to provide a comfortable ride to the user.

What is claimed is:

1. A chassis structure for a mid-wheel drive power wheelchair comprising:

a frame comprising a front section, two side sections, and three connecting rods, the three connecting rods being pivotally connected to the front section and the two side sections, respectively;

a transverse pipe having two ends and a middle section between the two ends, the middle section being connected with the connecting rod on the front section of the frame;

a pair of front wheel rods each having a first end, a second end and a first connecting portion between the first end and the second end, the first end being connected with a front wheel;

a pair of driving units each secured to the second end of a relative front wheel rod and comprising a driving wheel and a second connecting portion;

a pair of connecting racks each having a first end and a second end, the first end being pivotally connected to the first connecting portion of a relative front wheel rod, the second end being connected with to a press cylinder, the press cylinder having a third connecting portion, the pair of connecting racks being secured to the two ends of the transverse pipe, respectively;

a pair of restricting racks each comprising a first restricting plate and a second restricting plate, the first restricting plate having a first end, a second end and a first slot at a central portion thereof, the second restricting plate having a first end, a second end and a second slot at a central portion thereof, a first fixing member inserting through the second end of the first restricting plate and the second slot of the second restricting plate, a second fixing member inserting through the second end of the second restricting plate and the first slot of the first restricting plate, the first restricting plate and the second restricting plate overlapping for extending and restricting with each other, the first end of the first restricting plate being pivotally connected to the second connecting portion of a relative driving unit; and a pair of rear wheel rods each having a first end and a second end, the first end being connected with a rear wheel, the second end having a fourth connecting portion and a fifth connecting portion and being connected with an action rod, the action rod having a first end and a second end, the connecting rod on a relative side section of the frame being inserted through the first end of the action rod and pivotally connected to the fourth connecting portion of the second end of a relative rear wheel rod, the second end of the action rod being secured to a relative connecting rack, the action rod having a sixth connecting portion, the sixth connecting portion being pivotally connected to the first end of the second restricting plate of a relative restricting rack, the fifth connecting portion of the second end of the rear wheel rod being connected to the third connecting portion of a relative press cylinder.

2. The chassis structure for a mid-wheel drive power wheelchair as claimed in claim 1, wherein the two ends of the transverse pipe are provided with rubber sleeves.

* * * * *